United States Patent [19]

Kasagi

[11] Patent Number: 4,491,801
[45] Date of Patent: Jan. 1, 1985

[54] MATRIX CIRCUIT FOR PROCESSING PLURAL SIGNALS

[75] Inventor: Yoshitaka Kasagi, Fukaya, Japan

[73] Assignee: Tokyo Shibaura Denki Kabushiki Kaisha, Kawasaki, Japan

[21] Appl. No.: 332,293

[22] Filed: Dec. 18, 1981

[30] Foreign Application Priority Data

Dec. 25, 1980 [JP] Japan ................. 55-184920

[51] Int. Cl.³ .............. H03F 3/45; H04N 9/50; G06G 7/00; H04S 1/00
[52] U.S. Cl. ........................ 330/69; 358/24; 358/31; 328/158; 307/362; 381/20
[58] Field of Search ............... 358/24, 23, 31, 30; 328/135, 167, 156–158; 333/166, 25; 179/1 GB, 1 GC, 1 GD, 1 GJ; 307/260, 261, 358, 362, 355; 330/69, 258

[56] References Cited

U.S. PATENT DOCUMENTS 3,707,596 12/1972 Kuhn ..................... 358/31
3,761,831 9/1973 Foerster ................. 330/69
3,992,590 11/1976 Takahashi et al. ........ 179/1 GB Primary Examiner—John C. Martin
Attorney, Agent, or Firm—Cushman, Darby & Cushman

[57] ABSTRACT

Unbalanced two input signals are applied to a buffer. The buffer provides to an balanced adder with balanced buffer output signals. The adder adds the buffer output signals and generates an unbalanced addition output signal. The addition output signal is inputted to one of balanced inputs of a first subtractor the other input of which is supplied with a reference potential. The buffer output signals are supplied to balanced inputs of a second subtractor. The first subtractor generates a sum of unbalanced two input signals of the buffer, and the second subtractor generates a difference thereof.

13 Claims, 6 Drawing Figures

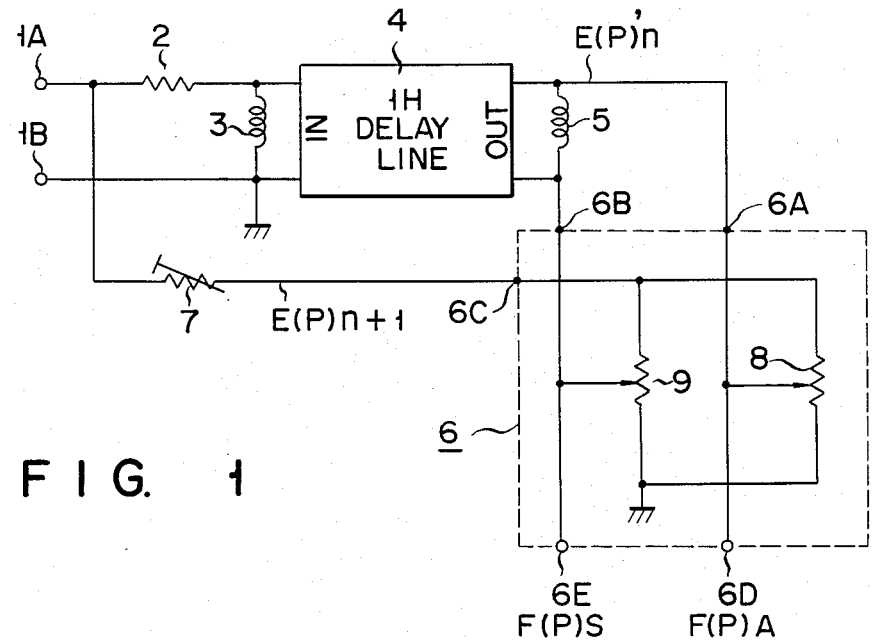
F I G. 1
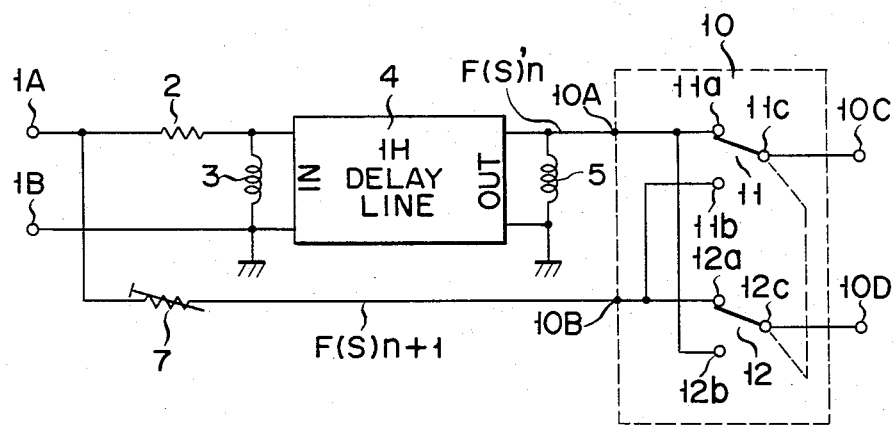
F I G. 2

MATRIX CIRCUIT FOR PROCESSING PLURAL SIGNALS

BACKGROUND OF THE INVENTION

This invention relates to a matrix circuit for adding and subtracting a plurality of signals suitable for embodying a color matrix circuit of PAL/SECAM compatible type color TV receiver.

As is generally known there are three standard color TV systems, i.e. NTSC, PAL and SECAM systems. Any nation practicing a color TV broadcasing uses one of these three standard systems. In these systems PAL and SECAM are used mainly in European and African nations. Thus, PAL system and SECAM system are employed in neighbouring countries. These different color broadsting systems possess common parts except the part for processing a chrominance signal. Accordingly, the demand for a special TV receiver which is compatible with the PAL and SECAM systems increases as color TV receivers are gradually being popularized in European and African nations.

The chrominance signal of color TV signals used for PAL system is composed by the following steps. Tricolor signals R, G and B obtained from a color TV camera are converted by a color matrix circuit into a luminance signal Y and color difference signals (R−Y) and (B−Y). The color difference signals are subjected to a frequency band restriction. Then the band-restricted color difference signals are used in a two-phase quadrature amplitude modulator, for modulating a chrominance subcarrier to provide the carrier chrominance signal. In the modulator the phase of (R−Y) modulation axis is phase-inverted at intervals of each horizontal scanning period. The advantage of PAL system that the demodulated chrominance signal is little affected by a phase distortion in the subcarrier is derived from the following processings. First, a signal with a delay corresponding to one horizontal scanning period (hereinafter referred to as "1H"), i.e. a delayed signal travelling a 1H delay line, and a nondelayed signal bypassing the 1H delayed line are obtained from the carrier chrominance signal. Second, the delayed and nondelayed signals are combined in a PAL matrix circuit to produce (B−Y) and (R−Y) carrier chrominance signals. The above-mentioned advantage will be obtained from averaging the signals of two horizontal scanning periods (2H).

In the SECAM system a chrominance signal of color TV signals also provides color difference signals (B−Y) and (R−Y). During the transmission of the (R−Y) carrier chrominance signal through a 1H delay line, the (B−Y) carrier chrominance signal is outputted. Then the alternative transmitted carrier chrominance signals are obtained simulataneously.

In a prior art TV receiver being compatible with PAL and SECAM systems, each of PAL and SECAM circuits equips an exclusive 1H delay line for the individual system. As the circuit integration of color circuitry is scaled up with the progress of semiconductor IC technology, the cost of a 1H delay line relatively increases. If one 1H delay line may commonly be used for PAL and SECAM systems, the cost of a PAL/SECAM compatible type TV receiver will effectively be reduced.

The drawback of the prior art will be discussed with referring to FIGS. 1 and 2. FIG. 1 shows a circuit arrangement of PAL matrix circuit. In this figure one input terminal 1A is grounded through an impedance matching circuit of a resistor 2 and an inductor 3. The other input terminal 1B is grounded. The both terminal ends of inductor 3 are coupled with the input terminals of a 1H delay line 4. Connected to the output terminals of 1H delay line 4 are an impedance matching inductor 5 and input terminals 6A and 6B of a resistance matrix circuit 6. Another input terminal 6C of resistance matrix circuit 6 is connected via a trimmer resistor 7 to the input terminal 1A. Thus, an input signal at the input terminal 1A is transferred to the input terminal 6C without signal delay. The matrix circuit 6 includes a resistor 8 connected between the input terminal 6C and the circuit ground, and a resistor 9 connected in parallel with the resistor 8. The center tap of resistor 8 is connected to the input terminal 6A and also to an output terminal 6D of matrix circuit 6. Similarly, the center tap of resistor 9 is connected to the input terminal 6B and an output terminal 6E of matrix circuit 6.

The circuit configuration of FIG. 1 will operate as follows.

A PAL carrier chrominance signal F(P)n being ahead of a given time which corresponds to 1H has been applied to the input terminal 1A. The signal F(P)n is converted through the 1H delay line 4 to a first carrier chrominance signal F(P)′n with a time delay of 1H. Then the first carrier chrominance signal F(P)′n and a second carrier chrominance signal F(P)n+1 applied to the input terminal 1A are simultaneously inputted to the matrix circuit 6. In the matrix circuit 6, the first carrier chrominance signal F(P)′n and the second carrier chrominance signal F(P)n+1 flow into the resistor 8 of adding side to provide an addition output F(P)A, wherein the signal F(P)′n has an inphase relation with the signal F(P)n+1. Further, the signal F(P)n+1 and the signal −F(P)′n whose phase has an antiphase relation with the signal F(P)n+1 flow into the resistor 9 of subtracting side to provide a subtraction output F(P)S.

FIG. 2 shows a circuit arrangement of SECAM type color signal switching circuit. In FIGS. 1 and 2, for avoiding a redundant explanation, the common circuit component is denoted by the same reference numeral. In FIG. 2, one output terminal of a 1H delay line 4 is connected to an input terminal 10A of a SECAM switching circuit 10, while the other output terminal of 1H delay line 4 is grounded. An input terminal 1A is connected via a trimmer resistor 7 to an input terminal 10B of the switching circuit 10. Carrier chrominance signals are obtained from output terminals 10C and 10D of the switching circuit 10. The switching circuit 10 is formed of a two-ganged type electronic switches 11 and 12. The input terminal 10A is connected to fixed contacts 11a and 12b of switches 11 and 12. The input terminal 10B is connected to fixed contacts 11b and 12a thereof. Movable contact pieces 11c and 12c are connected to the output terminals 10C and 10D, respectively.

In such circuit configuration, when a SECAM carrier chrominance signal F(S)n being ahead of 1H has been applied to the input terminal 1A, the 1H delay line 4 provides a first chrominance signal F(S)′n to the input terminal 10A of switching circuit 10. A carrier chrominance signal F(S)n+1 applied now to the input terminal 1A is inputted as a second carrier chrominance signal to the input terminal 10B of switching circuit 10. The switches 11 and 12 are switched at intervals of the horizontal scanning period (1H). Accordingly the (R−Y)

signal appears at the terminal 10C and the (B−Y) signal at the terminal 10D.

The circuit configurations of FIGS. 1 and 2 will operate as mentioned above. These figures teach that balanced outputs are required for the 1H delay line 4 of PAL circuit (FIG. 1) whereas an unbalanced output is necessary to the 1H delay line 4 of SECAM circuit (FIG. 2). Therefore, if only one 1H delay line 4 in a TV receiver should be used for both PAL and SECAM circuits, it is impossible to avoid the use of a special switch for the output circuit of delay line 4. Such special switch, however, increases the manufacturing cost and thus cancels the cost down merit obtained from decreasing two delay lines to one delay line.

SUMMARY OF THE INVENTION

It is accordingly an object of the present invention to provide a matrix circuit for processing plural signals, particularly to provide a matrix circuit which permits both PAL and SECAM color demodulations with a single 1H delay line.

It is an additional object of this invention to provide a matrix circuit for demodulating an FM stereo signal.

According to the present invention, a matrix circuit for processing plural signals includes a buffer having a pair of unbalanced input terminals and a pair of balanced output terminals. The output terminals of the buffer are coupled to a pair of balanced input terminals of an adder and also to a pair of balanced input terminals of a subtractor.

When the above-mentioned matrix circuit is applied to a PAL color demodulator, an output terminal of the adder is connected to a first demodulator for demodulating, e.g. a (B−Y) color difference signal, and an output terminal of the subtractor is connected to a second demodulator for demodulating an (R−Y) color difference signal. Further, one input terminal of the buffer is supplied with a 1H delayed chrominance signal F(P)′n, and applied to the other input terminal thereof is a nondelayed chrominance signal F(P)n+1. In such a configuration, the input circuit of the buffer is an unbalanced type as in the input circuit of SECAM switching circuit (FIG. 2). Therefore, a 1H delay line having unbalanced output terminal may be used for both PAL and SECAM color demodulators without any special switch for selecting PAL system or SECAM system, which special switch will increase the cost and size of color demodulator.

On the other hand, the matrix circuit including aforementioned constructions may be applied to an FM stereo demodulator. In this case a sum signal (L+R) is supplied to one input terminal of the buffer and a difference signal (L−R) to the other input terminal thereof. The adder outputs an addition (2L) of the sum and difference signals. The subtractor outputs a subtraction (2R) of the difference signal from the sum signal.

According to the present invention, although the input terminals are unbalanced, the inner circuit arrangement of the matrix may be a balance type. Thus, the matrix circuit may be formed of a DC coupled differential amplifier suitable for circuit integration. Such circuit-integrated matrix of differential amplifier will be little affected by a temperature drift and also require a little external parts.

BRIEF DESCRIPTION OF THE DRAWINGS

The objects and advantages of the present invention will become apparent to persons skilled in the art from a study of the following description of the accompanying drawings.

FIG. 1 is a circuit configuration of a conventional PAL matrix circuit;

FIG. 2 is a circuit configuration of a conventional SECAM switching circuit;

DETAILED DESCRIPTION OF THE PREFERRED EMBODIMENTS

Figure 3:
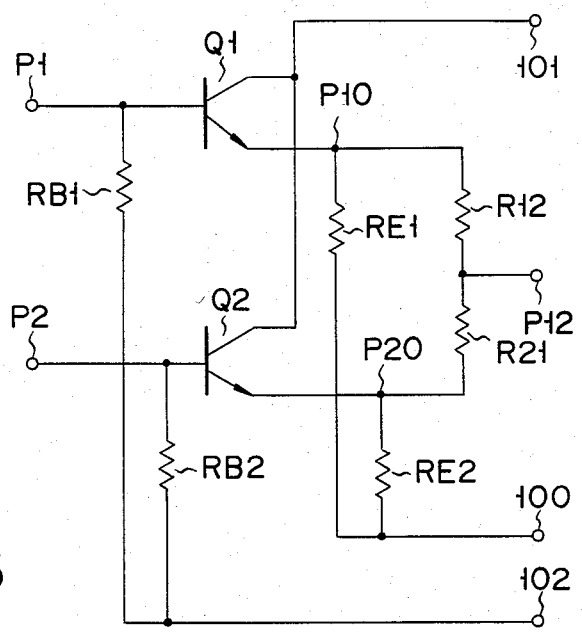
FIG. 3 shows a buffer having a pair of unbalanced input terminals and a pair of balanced output terminals, and a resistor adder having a pair of balanced input terminals and an unbalanced output terminal.

Before proceeding with the description of the embodiments of the invention, it will be understood that like reference symbols are used to designate like portions throughout the drawings for brevity's sake. Referring now to FIG. 3, the emitter of an NPN transistor Q1 is connected via a resistor RE1 to a reference potential terminal 100. The emitter of an NPN transistor Q2 is coupled through a resistor RE2 to the terminal 100. The collectors of transistors Q1 and Q2 are connected to a power supply terminal 101. The base of transistor Q1 is connected to an input terminal P1 and also to a bias supply terminal 102 through a resistor RB1. The base of transistor Q2 is connected to an input terminal P2 and to the terminal 102 through a resistor RB2.

The components Q1, RE1 and RB1 form a first emitter follower, and the components Q2, RE2 and RB2 form a second emitter follower. These emitter followers are used as a buffer having a pair of unbalanced input terminals (P1, P2) and a pair of balanced output terminals (P10, P20).

The emitter of transistor Q1 and the emitter of transistor Q2 are connected to an output terminal P12 through resistors R12 and R21, respectively. The components R12 and R21 are used as an adder having a pair of balanced input terminals (P10, P20) and an unbalanced output terminal (P12).

Since an output impedance of the second emitter follower (Q2) may substantially be regarded as zero ohm, when a first signal F1 is applied to the input terminal P1 of first emitter follower (Q1), the signal F1 is voltage-divided by the resistors R12 and R21, and a signal of F1/2 appears at the output terminal P12. Similarly, when a second signal F2 is applied to the input terminal P2 of second emitter follower (Q2), the signal F2 is divided by the resistors R12 and R21 with zero output impedance of the first emitter follower (Q1), and a signal of F2/2 appears at the terminal P12. When the signals F1 and F2 are simultaneously applied to the respective input terminals P1 and P2, the signals F1/2 and F2/2 appear at the output terminal P12 are combined to generate an added signal (F1+F2)/2 pursuant to the principle of superposition.

Incidentally, signal leakage from the terminal P1 to the terminal P2 and vice versa could happen through the resistors RB1 and RB2. Such leakage, however, will substantially be negligible when a bias supply impedance at the terminal 102 is far smaller than the resistors RB1 and RB2.

Figure 4:
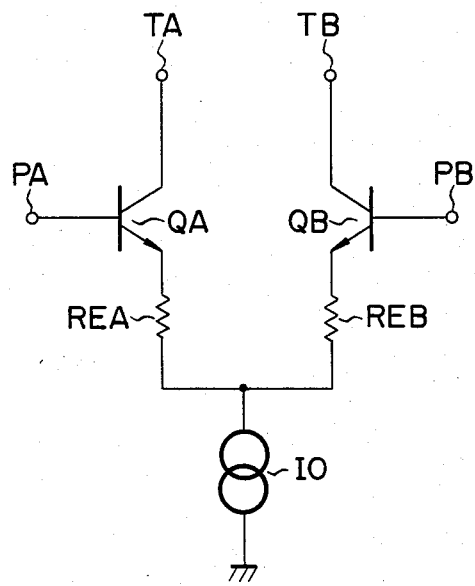
FIG. 4 shows a subtractor having a pair of balanced input terminals and a pair of balanced output terminals.

FIG. 4 shows a basic configuration of a balance type subtractor. The emitter of an NPN transistor QA is connected via a resistor REA to one end of a constant current source IO. The other end of current source IO is grounded. The one end of current source IO is connected via a resistor REB to the emitter of an NPN transistor QB. The bases of transistors QA and QB are connected respectively to input terminals PA and PB, and collectors thereof to output terminals TA and TB. The components QA, QB, REA, REB and IO form a differential amplifier.

When a first signal FA is applied to an input terminal PA or the base of transistor QA, a phase inverted signal −FAO appears at an output terminal TA or the collector thereof, and a phase noninverted signal FAO appears at an output terminal TB or the collector of transistor QB. When a second signal FB is applied to an input terminal PB or the base of transistor QB, a phase inverted signal −FBO is obtained from the collector of transistor QB, and a phase noninverted signal FBO is obtained from the collector of transistor QA. Suppose here that the gain of the differential amplifier is G. Then the relations between the absolute values of $|FA|$ and $|FAO|$, and $|FB|$ and $|FBO|$ are $|FAO|=G|FA|$, and $|FBO|=G|FB|$. Accordingly, when the signals FA and FB are simultaneously applied to the input terminals PA and PB respectively, an output of $-FAO+FBO=-G(FA-FB)$ appears at the collector of transistor QA, and an output of $FAO-FBO=G(FA-FB)$ appears at the collector of transistor QB. Thus, the subtracting operation is carried out in the differential amplifier.

Figure 5:
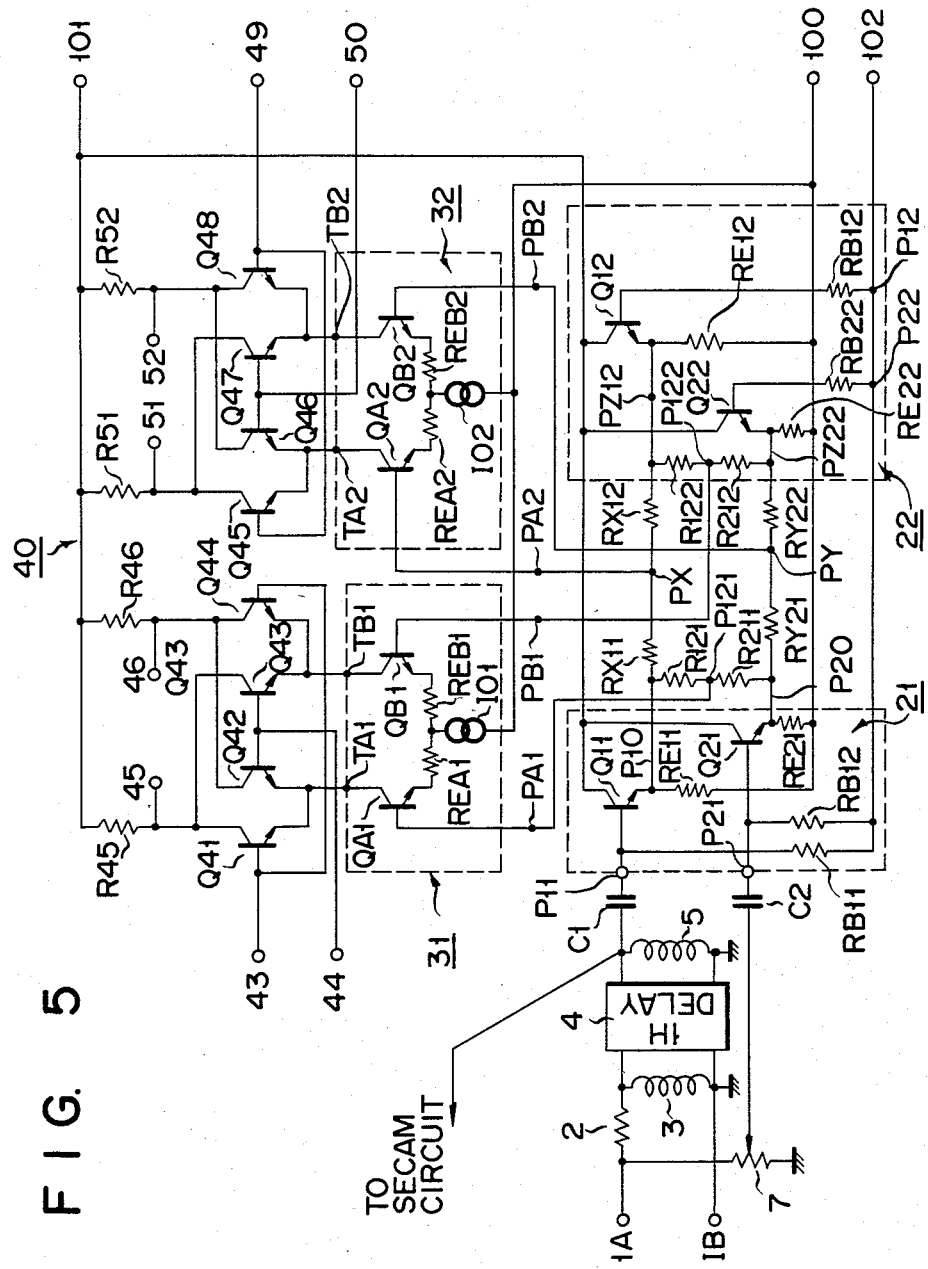
FIG. 5 is a circuit diagram of a PAL color demodulator including a matrix circuit of the present invention.

FIG. 5 shows one embodiment of a PAL color demodulator including a matrix circuit according to the invention. A PAL carrier chrominance signal Fn applied to an input terminal 1A is delayed by 1H through a 1H delay line 4 whose input and output circuits are unbalanced. In a PAL/SECAM compatible TV set, the output circuit of delay line 4 is coupled to a SECAM switching circuit (FIG. 2). A delayed signal or a first input signal Fn' obtained from the output circuit of delay line 4 is inputted to an input terminal P11 of a buffer 21 via a capacitor C1. A subsequent carrier chrominance signal applied to the terminal 1A at the time when the first input signal Fn' is just inputted to the terminal P11 is level-adjusted by a variable resistor 7. The variable resistor 7 outputs a second input signal Fn+1 having the same level as that of the first input signal Fn' and supplies the signal Fn+1 to an input terminal P21 of the buffer 21 via a capacitor C2.

The buffer 21 includes a pair of emitter followers being formed of NPN transistors Q11 and Q21. The collectors of transistors Q11 and Q21 are connected to a power supply terminal 101. The emitter of transistor Q11 or an output terminal P10 is connected via a resistor RE11 to a circuit ground which is coupled to a ground terminal 100. The emitter of transistor Q21 or an output terminal P20 is connected to the terminal 100 through a resistor RE21. The bases of transistors Q11 and Q21 are connected to a bias supply terminal 102 through resistors RB11 and RB12, respectively. The base of transistor Q11 receives the first input signal Fn' and the transistor Q11 provides at its emitter a first signal Fn'. The base of transistor Q21 receives the second input signal Fn+1 and the transistor Q21 provides at its emitter a second signal Fn+1. Since the gain of emitter follower is practically 0 dB, the first signal Fn' is substantially the same as the signal appearing at the terminal P11, and the second signal Fn+1 the same as the signal at the terminal P21.

The buffer 21 has a pair of unbalanced buffer input terminals P11 and P21 and a pair of balanced buffer output terminals P10 and P20. The buffer 21 unilaterally transfers input signals at the buffer input terminals P11, P21 to the buffer output terminals P10, P20 from which the first and second signals Fn', Fn+1 are obtained.

The buffer output terminals P10 and P20 are coupled with an adder being formed of serially connected resistors R121 and R211. When the first signal Fn' and the second signal Fn+1 are respectively applied to the both ends of the series resistors R121 and R211, an addition signal of signals Fn' and Fn+1 is obtained from a connection node P121 or the juncture of resistors R121 and R211. Assume here that the output impedance of each of emitter follower transistors Q11 and Q21 is zero—this is a practical assumption—and the resistance of resistor R121 is the same as that of resistor R211. Under this assumption, the addition signal is $(Fn'+Fn+1)/2$, because the resistors R121 and R211 form a −6 dB attenuator.

The buffer output terminal P10 is connected to the emitter of an NPN transistor Q12 through resistors RX11 and RX12. The buffer output terminal P20 is connected to the emitter of an NPN transistor Q22 through resistors RY21 and RY22. The collectors of respective transistors Q12 and Q22 are connected to the power supply terminal 101. The bases of transistors Q12 and Q22 are connected to the bias supply terminal 102 through resistors RB12 and RB22, respectively. The emitters of transistors Q21 and Q22 are respectively connected to the terminal 100 via resistors RE12 and RE22. The emitter of transistor Q12 is connected through a series circuit of resistors R122 and R212 to the emitter of transistor Q22. Emitter followers of the transistors Q12 and Q22 form a reference potential source 22. The emitter of transistor Q12 defines a first reference potential terminal PZ12 of the source 22, and the emitter of transistor Q22 defines a second reference potential terminal PZ22 thereof. The juncture of resistors R122 and R212 defines a third reference potential terminal P122 of the source 22. The terminal P122 provides a given reference potential.

The connection node P121 of adder (R121, R211) is connected to the base of an NPN transistor QA1. The third reference potential terminal P122 of reference potential source 22 is connected to the base of an NPN transistor QB1. The emitter of transistor QA1 is connected to the emitter of transistor QB1 through a series circuit of resistors REA1 and REB1. The juncture of resistors REA1 and REB1 is connected to the terminal 100 via a constant current source IO1.

The transistors QA1 and QB1 form a first differential amplifier 31. The bases of transistors QA1 and QB1 define input terminals PA1 and PB1 of amplifier 31, and the collectors thereof define output terminals TA1 and TB1 of amplifier 31. Here, for offset balancing of the amplifier 31, the parallel-connected resistance of resistors R122 and R212 is to be substantially the same as that of resistors R121 and R211.

Since only a proper bias potential (DC) is applied to the bias supply terminal 102, signals (AC) do not appear at the respective terminals PZ12 and PZ22 of reference potential source 22. Thus, a signal level at the third reference potential terminal P122 or the input terminal PB1 is zero. As mentioned before, a signal level at the connection node P121 or the input terminal PA1 is (Fn'+Fn+1)/2. Accordingly, output signals at the respective output terminals TA1 and TB1 are −G1(Fn'+Fn+1)/2 and G1(Fn'+Fn+1)/2, provided that the gain of differential amplifier 31 is G1. The amplifier 31 provides a sum component (Fn'/2+Fn+1/2) of two input signals (Fn', Fn+1).

A connection node PX or the juncture of resistors RX11 and RX12 is connected to the base of an NPN transistor QA2. A connector node PY or the juncture of resistors RY21 and RY22 is connected to the base of an NPN transistor QB2. The emitter of transistor QA2 is connected to the emitter of transistor QB2 through a series circuit of resistors REA2 and REB2. The juncture of resistors REA2 and REB2 is grounded via a constant current source IO2. The transistors QA2 and QB2 form a second differential amplifier 32. The bases of transistors QA2 and QB2 define input terminals PA2 and PB2 of the amplifier 32, and the collectors thereof define output terminals TA2 and TB2 of the amplifier 32. Here, for off-set balancing of the amplifier 32, the parallel-connected resistance of resistors RX11 and RX12 is to be substantially the same as that of resistors RY21 and RY22.

As mentioned, signals applied from the buffer 21 to the resistors RX11 and RY21 are the signal Fn' and Fn+1, and no signal is applied from the source 22 to the resistors RX12 and RY22. Thus, when RX11=RX12 and RY21=RY22, a signal level at the node PX or the input terminal PA2 is Fn'/2, and a signal level at the node PY or the input terminal PB2 is Fn+1/2. Accordingly, output signals at the respective output terminals TA2 and TB2 are −G2(Fn'−Fn+1)/2 and G2(Fn'−Fn+1)/2, provided that the gain of differential amplifier 32 is G2. The amplifier 32 provides a difference component (Fn'/2−Fn+1/2) of two input signals (Fn', Fn+1).

When R121=R211, RX11=RX12 and RY21=RY22, the attenuation degree of resistors R121 and R211 is 6 dB, that degree of resistors RX11 and RX12 is 6 dB, and that degree of resistors RY21 and RY22 is also 6 dB. In this case, an amplitude of the sum component (Fn'/2+Fn+1/2) of amplifier 31 is generally equal to that of the difference component (Fn'/2−Fn+1/2) of amplifier 32. This is preferable to symmetrical circuit design for amplifiers 31, 32 and the following circuitries.

The matrix element of FIG. 5 may be expressed as:

$$\begin{pmatrix} G1(Fn'+Fn+1)/2 \\ G2(Fn'-Fn+1)/2 \end{pmatrix} = \frac{1}{2} \begin{pmatrix} G1 & G1 \\ G2 & -G2 \end{pmatrix} \begin{pmatrix} Fn' \\ Fn+1 \end{pmatrix} \quad (1)$$

Each of the transistors Q11, Q12, Q21 and Q22 generates a forward voltage drop $V_{BE}$ between its base-to-emitter path. The voltage drop $V_{BE}$ has a negative temperature coefficient $\partial V_{BE}/\partial T$ (T denotes temperature). That is, the emitter potentials (DC) of respective transistors will be lowered with temperature increase. When such temperature coefficients $\partial V_{BE}/\partial T$ of the transistors Q11, Q12, Q21 and Q22 are uniform, the DC potential difference between the terminals PA1 and PB1 as well as the DC potential difference between the terminals PA2 and PB2 will be independent of temperature. Namely, static operational conditions for the first and second differential amplifier 31 and 32 are practically fixed within a wide temperature range with the uniform temperature coefficients. This may be realized by a circuit integration in a single semiconductor chip.

The output terminal TA1 of amplifier 31 is connected to the emitters of NPN transistors Q41 and Q42. The output terminal TB1 thereof is connected to the emitters of NPN transistor Q43 and Q44. The bases of transistors Q41 and Q44 are connected to a first subcarrier input terminal 43, and the bases of transistors Q42 and Q43 are connected to a second subcarrier input terminal 44. The collectors of transistor Q41 and Q43 are connected to a first demodulation output terminal 45 and coupled through a first load resistor R45 to the power supply terminal 101. The collectors of transistors Q42 and Q44 are connected to a second demodulation output terminal 46 and coupled via a second load resistor R46 to the terminal 101. Inputted to the terminal 43 is ±(B−Y) color subcarriers, and a certain bias is applied to the terminal 44, thereby the transistors Q41 to Q44 constitute a balanced homodyne detector.

The output terminal TA2 of amplifier 32 is connected to the emitters of NPN transistors Q45 and Q46. The output terminal TB2 thereof is connected to the emitters of NPN transistor Q47 and Q48. The bases of transistors Q45 and Q48 are connected to a third subcarrier input terminal 49, and the bases of transistors Q46 and Q47 to a fourth subcarrier input terminal 50. The collectors of transistors Q45 and Q47 are connected to a third demodulation output terminal 51 and coupled through a third load resistor R51 to the power supply terminal 101. The collectors of transistors Q46 and Q48 are connected to a fourth demodulation output terminal 52 and coupled via a fourth load resistor R52 to the terminal 101. Inputted to the terminal 49 is ±(R−Y) color subcarriers, and a certain bias—generally the same the bias as that of terminal 44—is applied to the terminal 50. Then the transistors Q45 to Q48 form a balanced homodyne detector.

The transistors Q41 to Q44 form a first doubly balanced differential amplifier for generating a (B−Y) color difference signal. The transistors Q45 to Q48 form a second doubly balanced differential amplifier for generating an (R−Y) color difference signal. The transistors Q41 to Q48 form a chrominance demodulator 40 for composing color difference signals (B−Y, R−Y) from color subcarriers and carrier chrominance signals (Fn', Fn+1).

Figure 6:
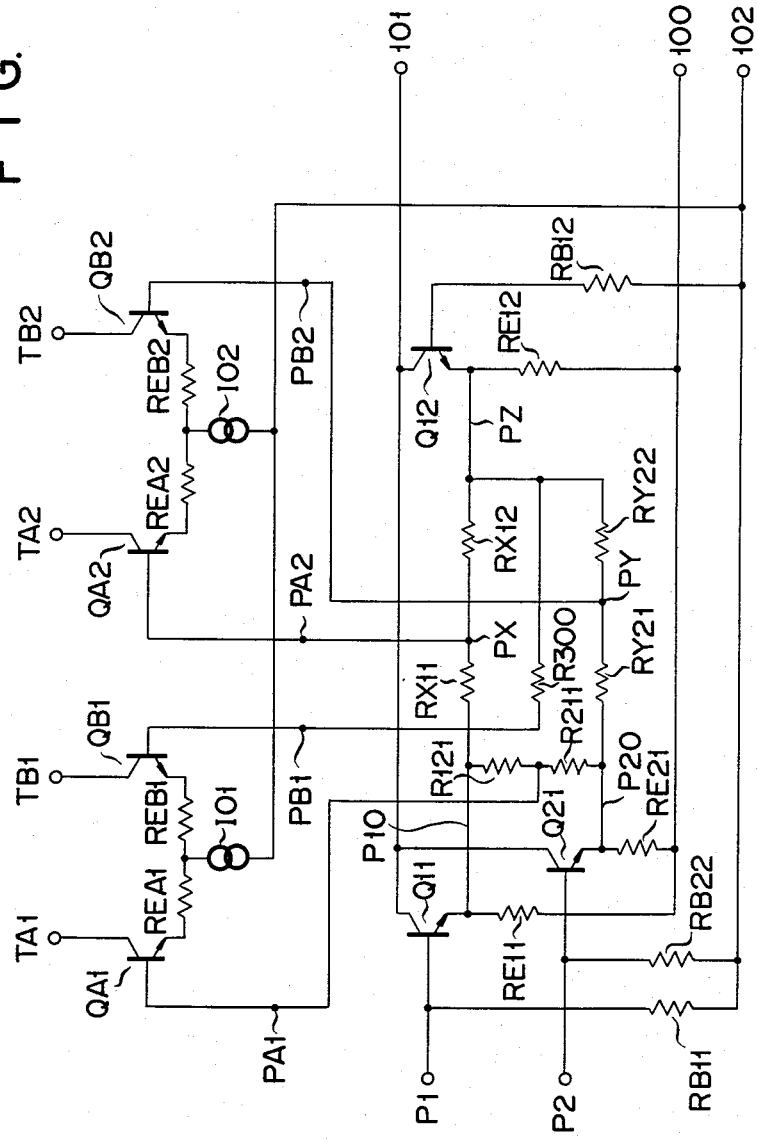
FIG. 6 shows a modification of the circuitry of FIG. 5.

FIG. 6 shows a moddification of the FIG. 5 configuration. The key of the modification is an NPN transistor Q12. In the FIG. 5 circuit, the function of transistor Q12 is same as that of transistor Q22. According to this fact, in FIG. 6 modification, a single transistor Q12 is used for transistors Q12 and Q22. The emitter of transistor Q12 defines a reference potential terminal PZ which correspnds to the terminals PZ12, PZ22 and PZ122 of FIG. 5. The terminal PZ is connected through a series circuit of resistors RX12 and RX11 to the emitter of an NPN transistor Q11, and through a series circuit of resistors RY22 and RY21 to the emitter of an NPN transistor Q21. The terminal PZ is also connected to the base of an NPN transistor QB1 via a resistor R300 whose resistance corresponds to a parallel-connected resistance of resistors R122 and R212 (FIG. 5). In such circuit configuration, the transistor Q12 provides to the transistor QB1 with a given reference potential and also supplies the same bias potentials to respective connection nodes PX and PY of resistors RX11, RX12 and RY21, RY22. Further, the temperature coefficient $\partial V_{BE}/\partial T$ of transistor Q12 will compensate the temperature variation of $V_{BE}s$ of transistors Q11 and Q12.

Although the explanation for the embodiment of FIG. 5 is given under the condition that the input and output of 1H delay line 4 are in-phasing each other, phase-inverted outputs may be obtained by exchanging the connection of the outputs of delay line 4. In this case, the outputs of the matrix circuit are reversed, i.e. the amplifier 31 provides a difference component, and the amplifier 32 a sum component, with the (B−Y) demodulator 31 and the (R−Y) demodulator 32 are exchanged, and a total operation of the matrix circuit is not changed.

The present invention may be applied to FM stereo demodulator. For instance, in FIG. 5 circuitry, the attenuation adder (R121+R211) and the first differential amplifier 31 will generate a left channel signal L from the sum of a first input signla Fn'=L+R and a second input signal Fn+1=L−R. The attenuator (RX11, RX12, RY21, RY22) and the second differential amplifier 32 will generate a right channel signal R from the difference of the signal Fn'=L+R and the signal Fn+1=L−R. Namely, from equation (1), following relation may be analogized.

$$\begin{pmatrix} L \\ R \end{pmatrix} = \frac{1}{2} \begin{pmatrix} 1 & 1 \\ 1 & -1 \end{pmatrix} \begin{pmatrix} L+R \\ L-R \end{pmatrix} \quad (2)$$

A matrix circuit according to the present invention may be realized with a complete balanced circuitry which requires no DC blocking capacitors for signal coupling. The invention therefore is suitable for IC matrix circuit of, e.g. a PAL/SECAM compatible system.

It will be apparent to those skilled in the art that various modifications and variations could be made in a matrix circuit without departing from the scope of the claimed invention.

What is claimed is:

1. A matrix circuit for processing plural signals comprising:
   (a) buffer means having a pair of unbalanced buffer input terminals and a pair of balanced buffer output terminals, for unilaterally transferring input signals applied to the buffer input terminals to the buffer output terminals, and providing at one of the buffer output terminal a first signal and at the other thereof a second signal;
   (b) addition means having a pair of balanced input terminals coupled to said buffer output terminals and having an unbalanced addition output terminal, for adding said first and second signals to provide at the addition output terminal a third signal;
   (c) first subtraction means having a pair of balanced subtraction input terminals one of whose terminals is coupled to said addition ouput terminal and the other of whose terminals is applied with a given reference potential, for subtracting said third signal from said given reference potential to provide a fourth signal which corresponds to said input signals; and
   (d) second subtraction means having a pair of balanced subtraction input terminals one of whose terminals is coupled to said one buffer output terminal and the other of whose terminals is coupled to said the other buffer output terminal, for subtracting said second signal from said first signal to provide an fifth signal which corresponds to said input signals;
   wherein output signals of the matrix circuit includes said fourth and fifth signals.

2. A matrix circuit of claim 1, wherein said addition means includes serially connected impedances for adding and attenuating said first and second signals with a first given attenuation degree; and further comprising:
   (e) attenuator means coupled between said buffer means and said second subtraction means for attenuating said first and second signals with a second given attenuation degree being substantially the same as said first given attenuation degree.

3. A matrix circuit of claim 2, wherein said attenuator means includes a first divider for voltage-dividing said first signal having a first resistance, and a second divider for voltage-dividing said second signal having a second resistance, the value of said first resistance being substantially the same as that of said second resistance so that an offset of said first resistance is canceled by an offset of said second resistance.

4. A matrix circuit according to any one of claims 1 to 3, wherein said first subtraction means includes a reference potential source for providing said given reference potential, which has substantially the said temperature variation characteristic as that of said buffer means in order that a DC level drift of said third signal with temperature variation is canceled by that of said given reference potential.

5. A matrix circuit fo processing a pair of input signals comprising:
   (a) a buffer including a 1st transistor whose base receives one of said input signals and whose emitter provides a 1st signal corresponding to said one input signal, and including a 2nd transistor whose base receives the other of said input signals and whose emitter provides a 2nd signal corresponding to said other input signal;
   (b) an adder including a 1st resistor whose one terminal is coupled to the emitter of said 1st transistor and a 2nd resistor whose one terminal is coupled to the emitter of said 2nd transistor, for adding said 1st and 2nd signals to provide an addition signal at a connection node of the other end of said 1st resistor and the other end of said 2nd resistor;
   (c) a 1st differential amplifier including a 3rd transistor whose base is coupled to said connection node and including a 4th transistor whose base is applied with a given reference potential, for subtracting said addition signal from said given reference potential to provide at the collector of said 3rd transistor a 3rd signal, and for subtracting said given reference potential from said addition signal to provide at the collector of said 4th transistor a 4th signal;
   (d) a 2nd differential amplifier including a 5th transistor whose base is coupled to the emitter of said 1st transistor and including a 6th transistor whose base is coupled to the emitter of said 2nd transistor, for subtracting said 1st signal from said 2nd signal to provide at the collector of said 5th transistor a 5th signal, and for subtracting said 2nd signal from said 1st signal to provide at the collector of said 6th transistor a 6th signal; and
   (e) a reference potential source coupled to the bases of said 4th, 5th and 6th transistors, for generating said given reference potential, and providing bias potentials corresponding to said given reference potential to respective bases of said 5th and 6th transistors;

wherein said 3rd to 6th signals are used for output signals of the matrix circuit.

6. A matrix circuit of claim 5, wherein said reference potential source includes a 1st bias transistor whose emitter provides one of said bias potentials and a 2nd bias transistor whose emitter provides the other of said bias potentials; said 1st transistor, 2nd transistor, 1st bias transistor and 2nd bias transistor all having substantially the same temperature coefficient of base-emitter forward voltage drop.

7. A matrix circuit of claim 6, wherein said reference potential source further includes a 1st offset balancing resistor connected between the emitter of said 1st bias transistor and the base of said 4th transistor, and a 2nd offset balancing resistor connected between the emitter of said 2nd bias transistor and the base of said 4th transistor, the parallel-connected resistance of said 1st and 2nd offset balancing resistors being substantially the same as that of said 1st and 2nd resistors.

8. A matrix circuit of claim 5, wherein said reference potential source includes a bias transistor whose emitter provides said bias potentials; said 1st transistor, 2nd transistor and bias transistor all having substantially the same temperature coefficient of base-emitter forward voltage drop.

9. A matrix circuit of claim 8, wherein said reference potential source further includes an offset balancing resistor connected between the emitter of said bias transistor and the base of said 4th transistor; the resistance of said offset balancing resistor being substantially the same as the parallel-connected resistance of said 1st and 2nd resistors.

10. A matrix circuit of claim 5, further comprising:
(f) a 1st doubly balanced differential amplifier including a 7th transistor whose emitter is coupled to the collector of said 3rd transistor, an 8th transistor whose emitter is coupled to the collector of said 3rd transistor, a 9th transistor whose emitter is coupled to the collector of said 4th transistor, and a 10th transistor whose emitter is coupled to the collector of said 4th transistor, the base of said 7th and 10th transistors being applied with a 1st carrier signal, the bases of said 8th and 9th transistors being applied with a 2nd carrier signal;
(g) a 1st load coupled to the collectors of said 7th and 9th transistors for converting collector currents thereof to a 1st output signal which corresponds to said 1st carrier signal modulated by said 3rd signal and to said 2nd carrier signal modulated by said 4th signal; and
(h) a 2nd load coupled to the collectors of said 8th and 10th transistors for converting collector currents thereof to a 2nd output signal which corresponds to said 1st carrier signal modulated by said 4th signal and 5 said 2nd carrier signal modulated by said 3rd signal.

11. A matrix circuit of claim 5, further comprising:
(i) a 2nd doubly balanced differential amplifier including a 11th transistor whose emitter is coupled to the collector of said 5th transistor, a 12th transistor whose emitter is coupled to the collector of said 5th transistor, a 13th transitor whose emitter is coupled to the collector of said 6th transistor, and a 14th transistor whose emitter is coupled to the collector of said 6th transistor, the bases of said 11th and 14th transistors being applied with a 3rd carrier signal, the bases of said 12th and 13th transistors being applied with a 4th carrier signal;
(j) a 3rd load coupled to the collectors of said 11th and 13th transistors for converting collector currents thereof to a 3rd output signal which corresponds to said 3rd carrier signal modulated by said 5th signal and to said 4th carrier signal modulated by said 6th signal; and
(k) a 4th load coupled to the collectors of said 12th and 14th transistors for converting collector currents thereof to a 4th output signal which corresponds to said 3rd carrier signal modulated by said 6th signal and to said 4th carrier signal modulated by said 5th signal.

12. A matrix circuit according to any one of claims 5 to 11, wherein said adder outputs said addition signal with a 1st given attenuation degree; and further comprising:
(l) an attenuator coupled between said buffer and said 2nd differential amplifier, for attenuating said 1st and 2nd signals with a 2nd given attenuation degree being substantially the same as said 1st given attenuation degree.

13. A matrix circuit of claim 12, wherein said attenuator includes a 1st divider for voltage-dividing said 1st signal having a 1st resistance, and a 2nd divider for voltage-dividing said 2nd signal having a 2nd resistance, the value of said 1st resistance being substantially the same as that of said 2nd resistance so that an offset of said first resistance is canceled by an offset of said second resistance.

* * * * *